(12) United States Patent
Inoguchi et al.

(10) Patent No.: US 9,401,618 B2
(45) Date of Patent: Jul. 26, 2016

(54) CONTROL CIRCUIT, AND POWER GENERATION DEVICE HAVING THE SAME

(71) Applicant: SHINDENGEN ELECTRIC MANUFACTURING CO., LTD., Tokyo (JP)

(72) Inventors: Yuta Inoguchi, Saitama (JP); Takeaki Sugimoto, Saitama (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 227 days.

(21) Appl. No.: 14/365,665

(22) PCT Filed: Dec. 25, 2012

(86) PCT No.: PCT/JP2012/083505
§ 371 (c)(1),
(2) Date: Jun. 16, 2014

(87) PCT Pub. No.: WO2013/140694
PCT Pub. Date: Sep. 26, 2013

(65) Prior Publication Data
US 2014/0306682 A1     Oct. 16, 2014

(30) Foreign Application Priority Data
Mar. 19, 2012   (JP) .................. 2012-061532

(51) Int. Cl.
*H02P 9/00*      (2006.01)
*H02J 7/00*      (2006.01)
*H02P 9/48*      (2006.01)
*H02J 7/14*      (2006.01)
*H02P 101/45*    (2015.01)

(52) U.S. Cl.
CPC ............... *H02J 7/007* (2013.01); *H02J 7/1415* (2013.01); *H02P 9/48* (2013.01); *H02P 2101/45* (2015.01)

(58) Field of Classification Search
CPC .......................................................... H02P 9/00
USPC ............................................................ 290/7
See application file for complete search history.

(56) References Cited

U.S. PATENT DOCUMENTS

| | | | | | |
|---|---|---|---|---|---|
| 2,266,607 | A | * | 12/1941 | Kaufmann | ............... H02P 9/00 290/7 |
| 2,648,783 | A | * | 8/1953 | Clark | ....................... H02P 9/00 290/30 R |
| 2007/0229009 | A1 | * | 10/2007 | Egami | ................... B60K 6/365 318/432 |

FOREIGN PATENT DOCUMENTS

| | | |
|---|---|---|
| JP | H05-56698 A | 3/1993 |
| JP | 2010-74973 A | 4/2010 |

(Continued)

OTHER PUBLICATIONS

Written Opinion for PCT/JP2012/083505, Apr. 2, 2013.

(Continued)

*Primary Examiner* — Joseph Waks

(57) ABSTRACT

Provided is a control circuit capable of efficiently supplying electric power from an alternating-current generator to a load, and a power generation device having this control circuit. A control circuit 1 for controlling electric power to be supplied from a power generator 5 to a battery 6 is provided with: a rate-of-change obtaining unit 11 configured to obtain a rate of change of a sensor cycle for a sensor signal synchronous with an operation of the power generator 5; an estimation unit 12 configured to estimate a next sensor cycle using the rate of change of the sensor cycle obtained by the rate-of-change obtaining unit; and an output-supply control unit 13 configured to perform PWM control of switching elements provided for a drive circuit 30 using the next sensor cycle estimated by the estimation unit 12.

3 Claims, 12 Drawing Sheets

(56) References Cited

FOREIGN PATENT DOCUMENTS

| JP | 2010-252551 A | 11/2010 |
| JP | 2012-39698 A | 2/2012 |
| JP | DE 102014013102 A1 * | 3/2015 ............ F02D 41/123 |

OTHER PUBLICATIONS

International Search Report for PCT/JP2012/083505, Apr. 2, 2013.

* cited by examiner

CONTROL CIRCUIT, AND POWER GENERATION DEVICE HAVING THE SAME

TECHNICAL FIELD

The present invention relates to a control circuit for controlling electric power supplied from an alternating-current generator to a load, and a power generation device having this control circuit.

BACKGROUND ART

There has conventionally been proposed a control circuit for controlling electric power supplied from an alternating-current generator to a load. For example, PTL 1 discloses an alternating-current generator driven by a four-stroke engine, and a control circuit for controlling electric power supplied from this alternating-current generator to a load.

CITATION LIST

Patent Literature

PTL 1: Japanese Unexamined Patent Application Publication No. 2010-74973

SUMMARY OF THE INVENTION

Technical Problem

An output from an alternating-current generator is alternate current. Therefore, it is not possible to supply electric power to the load appropriately unless timing at which the output from the alternating-current generator is supplied to the load is appropriately controlled.

Further, while a four-stroke engine involves four strokes of intake, compression, ignition, and exhaust in a single cycle, time periods of these strokes are different from each other as shown in FIG. 11 and FIG. 12. A difference between the time periods of the strokes increases as a revolving speed of the engine decreases.

FIG. 11 is a chart showing time periods of the strokes in the four-stroke engine. In FIG. 11, the vertical axis indicates a sensor cycle, and the horizontal axis indicates the number of measurement of the sensor cycle.

FIG. 12 is a chart showing rates of change of the time periods of the strokes in the four-stroke engine. In FIG. 12, the vertical axis indicates a rate of change of the sensor cycle, and the horizontal axis indicates the number of measurement of the sensor cycle.

In FIG. 11 and FIG. 12, the sensor cycle refers to a cycle of a sensor signal. The sensor signal refers to a one-shot pulse generated every time the four strokes of intake, compression, ignition, and exhaust are switched. Accordingly, it is possible to determine the time periods of the four strokes of intake, compression, ignition, and exhaust, respectively, by measuring the sensor cycles. In addition, from FIG. 11 and FIG. 12, it can be seen that the time periods of the four strokes of intake, compression, ignition, and exhaust are different from each other.

From what is shown in the above, appropriate timing at which an output from the alternating-current generator is to be supplied to the load changes. However, the conventional control circuit takes timing at which an output from the alternating-current generator is to be supplied to the load substantially constant. Therefore, there is often a case in which an output from the alternating-current generator cannot be supplied to the load at appropriate timing, resulting in a case in which electric power may not be supplied to the load efficiently. Further, as described above, such a case in which electric power may not be supplied to the load efficiently is in particular noticeable in a region where a revolving speed of the driving unit that drives the alternating-current generator is low.

In view of the above problem, an object of the present invention is to provide efficient supply of electric power from an alternating-current generator to a load.

Solution to Problem

In order to solve the above problem, the present invention proposes the following.

(1) The present invention proposes a control circuit (e. g., corresponding to a control circuit 1 in FIG. 1) for controlling electric power supplied from an alternating-current generator (e. g., corresponding to a power generator 5 in FIG. 1) to a load (e. g., corresponding to a battery 6 in FIG. 1). This circuit includes: an estimation unit (e. g., corresponding to an estimation unit 12 in FIG. 1) configured to estimate an operating condition (e. g., corresponding to a sensor cycle for a state 8 in FIG. 5) of the alternating-current generator in a cycle succeeding a current cycle (e. g., corresponding to a current cycle in FIG. 5) based on an operating condition (e. g., corresponding to a sensor cycle in FIG. 5) of the alternating-current generator in a cycle preceding the current cycle (e. g., corresponding to an immediately previous cycle in FIG. 5); and an output-supply control unit (e. g., corresponding to an output-supply control unit 13 in FIG. 1) configured to control supply of an output the alternating-current generator to the load using a result of the estimation by the estimation unit.

According to this aspect of the invention, the estimation unit and the output-supply control unit are provided for the control circuit for controlling electric power supplied from the alternating-current generator to the load. Further, the estimation unit estimates the operating condition of the alternating-current generator in the cycle succeeding the current cycle based on the operating condition of the alternating-current generator in the cycle preceding the current cycle. Moreover, the output-supply control unit controls the supply of the output from the alternating-current generator to the load using the result of the estimation by the estimation unit. Accordingly, it is possible to control an output supplied from the alternating-current generator to the load based on the previous operating condition of the alternating-current generator.

Here, there is a connection between the current operating condition of the power generator and the previous operating condition of the power generator. Therefore, it is possible to control an output supplied from the alternating-current generator to the load based on the current operating condition of the alternating-current generator, and thus to efficiently supply electric power from the alternating-current generator to the load.

(2) The present invention proposes that the control circuit described in (1) further includes: a rate-of-change obtaining unit (e. g., corresponding to a rate-of-change obtaining unit 11 in FIG. 1) configured to obtain a rate of change of duration of a first state (e. g., corresponding to a state 4 in FIG. 5) with respect to duration of a second state (e. g., corresponding to a state 3 in FIG. 5), when a state of the alternating-current generator shifts from the second state to the first state, and the estimation unit estimates the duration of the first state (e. g., corresponding to the state 8 in FIG. 5) when the state of the alternating-current generator shifts from the second state (e.

g., corresponding to a state 7 in FIG. 5) to the first state (e. g., corresponding to the state 8 in FIG. 5), based on the duration of the second state (e. g., corresponding to a sensor cycle for the state 7 in FIG. 5), and on the rate of change obtained by the rate-of-change obtaining unit in a previous cycle of the alternating-current generator (e. g., corresponding to a rate of change of a sensor cycle for the state 4 with respect to a sensor cycle for the state 3 in FIG. 5).

According to this aspect of the invention, the control circuit described in (1) is provided with the rate-of-change obtaining unit that obtains the rate of change of the duration of the first state with respect to the duration of the second state, when the state of the alternating-current generator shifts from the second state to the first state. In addition, the estimation unit estimates the duration of the first state when the state of the alternating-current generator shifts from the second state to the first state, based on the duration of the second state, and on the rate of change obtained by the rate-of-change obtaining unit in the previous cycle of the alternating-current generator. Therefore, it is possible to estimate the succeeding operating condition of the alternating-current generator based on the operating condition of the alternating-current generator in the previous cycle, and thus to provide the same effect as described above.

(3) The present invention proposes that the control circuit described in (2) is configured such that the output-supply control unit controls the supply of the output from the alternating-current generator to the load using the duration estimated by the estimation unit (e. g., corresponding to a sensor cycle for the state 8 in FIG. 5), a voltage supplied to the load (e. g., corresponding to an output voltage Vout(n−1) of the power generation control device 100 that will be later described) in a third state (e. g., corresponding to a state 6 in FIG. 5) that comes before the second state (e. g., corresponding to the state 7 in FIG. 5) and a target voltage (e. g., corresponding to a target voltage Vref that will be later described) in the third state, and a voltage supplied to the load (e. g., corresponding to an output voltage Vout(n) of the power generation control device 100 that will be later described) in the second state and a target voltage (e. g., corresponding to the target voltage Vref that will be later described) in the second state.

According to this aspect of the invention, the control circuit described in (2) is configured such that the output-supply control unit controls the supply of the output from the alternating-current generator to the load using the duration estimated by the estimation unit, the voltage supplied to the load in a third state that comes before the second state and the target voltage in the third state, and the voltage supplied to the load in the second state and a target voltage in the second state. Accordingly, it is possible to control the supply of an output from the alternating-current generator to the load using not only the previous operating condition of the power generator, but also the relation between the output voltage of alternating-current generator and the target voltage. Therefore, it is possible to more efficiently supply electric power from the alternating-current generator to the load.

(4) The present invention proposes a power generation device (e. g., corresponding to a battery charger AA in FIG. 1) including the control circuit as defined in one of (1) to (3), and electric power outputted from the alternating-current generator is supplied to the load.

According to this aspect of the invention, the control circuit according to one of (1) to (3) is provided for the power generation device, and electric power outputted from the alternating-current generator is supplied to the load. Therefore, it is possible to provide the same effect as described above.

Advantageous Effects of Invention

According to the present invention, it is possible to efficiently supply electric power from an alternating-current generator to a load.

DESCRIPTION OF EMBODIMENT

Hereinafter, an embodiment of the present invention will be described with reference to the drawings. It should be noted that components in the embodiment described below may be replaced by existing components and the like as appropriate, or may be configured in various different manners including combinations with other existing components. Therefore, the scope of the invention defined by the appended claims may not be limited to the following embodiment.

Figure 1:
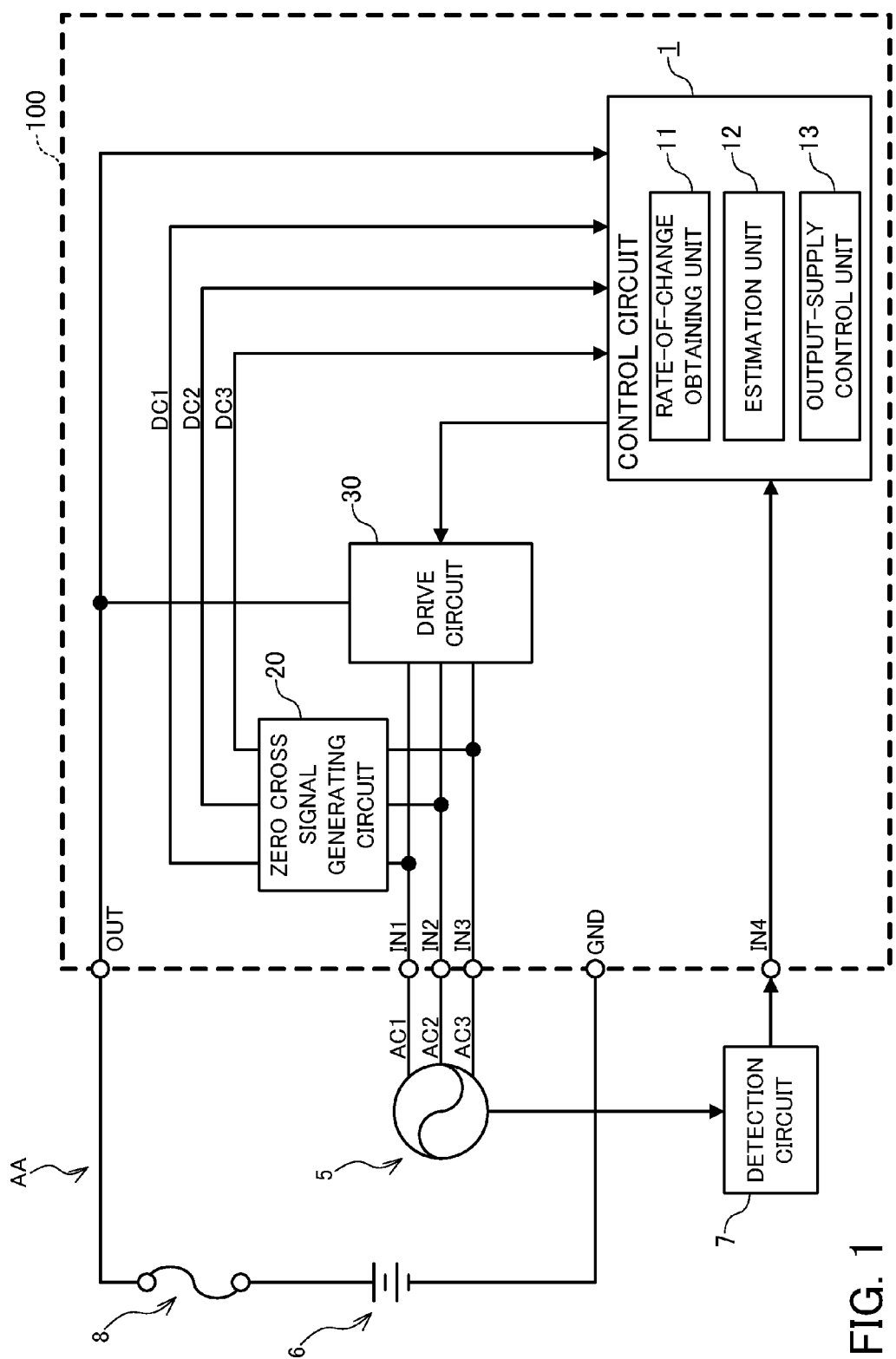
FIG. 1 is a circuit diagram of a battery charger according to one embodiment of the present invention.

FIG. 1 is a circuit diagram of a battery charger AA according to one embodiment of the present invention. The battery charger AA includes a power generator 5, a battery 6 that is charged by electric power outputted from the power generator 5, a detection circuit 7 for detecting an operating condition of the power generator 5, a fuse 8, and a power generation control device 100 as a regulator.

The power generator 5 is a three-phase alternating-current generator having three phases AC1, AC2, and AC3, and a single cycle of the power generator 5 includes N states (where N is an integer satisfying a relation of N≥2). For example, when the power generator 5 is driven by a four-stroke engine, a single cycle of the power generator 5 includes four states respectively corresponding to four strokes of intake, compression, ignition, and exhaust. The phases AC1-AC3 are respectively connected to input terminals IN1-IN3 of the power generation control device 100.

The detection circuit 7 detects an operating condition of the power generator 5, and outputs a sensor signal synchronous with an operation of the power generator 5. Specifically, the detection circuit 7 generates a one-shot pulse every time it detects that the state of the power generator 5 has switched, and outputs the generated pulse as the sensor signal. For example, when the power generator 5 is driven by the four-stroke engine, the one-shot pulse is generated every time the four strokes of intake, compression, ignition, and exhaust are switched.

To a positive electrode of the battery 6, an output terminal OUT of the power generation control device 100 is connected via the fuse 8. To a negative electrode the battery 6, a ground terminal GND of the power generation control device 100 connected to a source of reference potential is connected.

The power generation control device 100 includes a control circuit 1, a zero cross signal generating circuit 20, and a drive circuit 30.

The zero cross signal generating circuit 20 is connected to the input terminals IN1-IN3 and the control circuit 1. The zero cross signal generating circuit 20 rectifies voltages outputted respectively from the phases AC1-AC3 of the power generator 5, and outputs the rectified voltages respectively as signals DC1-DC3. Specifically, the voltage of the signal DC1 is taken as VH when the voltage outputted from the phase AC1 of the power generator 5 is no lower than a predetermined threshold voltage, and the voltage of the signal DC1 is taken as VL that is lower than VH when the voltage outputted from the phase AC1 is lower than the threshold voltage, and the resulting signal DC1 is outputted. Similarly to the voltage outputted from the phase AC1, this also applies to the voltages outputted respectively from the phases AC2 and AC3 of the power generator 5, and the voltages of the signals DC2 and DC3 are changed according to results of comparison with the threshold voltage and then outputted.

The drive circuit 30 is connected to the input terminals IN1-IN3 and the control circuit 1, and includes switching elements Q1, Q2, and Q3 (not depicted). Each of the switching elements Q1-Q3 is provided so as to be paired with each of the phases AC1-AC3 of the power generator 5. The drive circuit 30 controls each of the switching elements Q1-Q3 to be turned on and off according to a control signal outputted from the control circuit 1 to supply electric power outputted from each of the phases AC1-AC3 of the power generator 5 to the battery 6 via the output terminal OUT and the fuse 8. A relation between the control of the switching elements Q1-Q3 and electric power supplied to the battery 6 will be described below with reference to FIG. 2 and FIG. 3.

Figure 2:
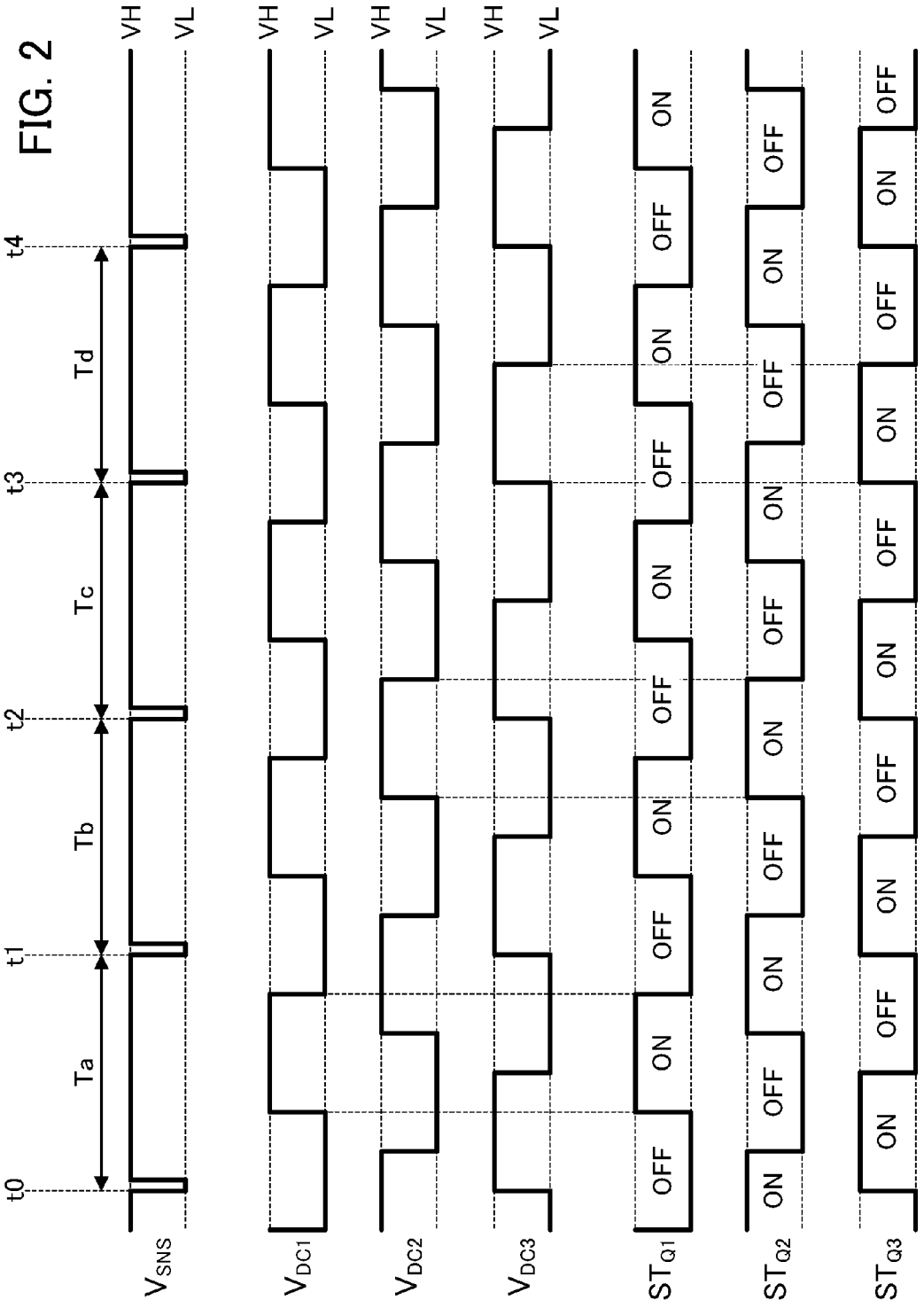
FIG. 2 is a timing chart showing an operation of switching elements provided for a drive circuit of a power generation control device provided for the battery charger.

FIG. 2 is a timing chart showing an operation of the switching elements Q1-Q3. In FIG. 2, $V_{SNS}$ represents a voltage of the sensor signal. $V_{DC1}$ represents a voltage of the signal DC1, i. e., a voltage resulting from rectification of the voltage outputted from the phase AC1 of the power generator 5. $V_{DC2}$ represents a voltage of the signal DC2, i. e., a voltage resulting from rectification of the voltage outputted from the phase AC2 of the power generator 5. $V_{DC3}$ represents a voltage of the signal DC3, i. e., a voltage resulting from rectification of the voltage outputted from the phase AC3 of the power generator 5. $ST_{Q1}$ represents a state of the switching element Q1, $ST_{Q2}$ represents a state of the switching element Q2, and $ST_{Q3}$ represents a state of the switching element Q3.

At time points t0, t1, t2, t3, and t4, the voltage $V_{SNS}$ of the sensor signal takes VL for a predetermined period. This represents the one-shot pulses generated by the detection circuit 7, and indicates that the state of the power generator 5 is switched at each of the time points t0-t4.

Further, referring to FIG. 2, the switching element Q1 is turned to an ON state at timing at which the voltage $V_{DC1}$ rises from VL to VH, and the switching element Q1 is turned to an OFF state at timing at which the voltage $V_{DC1}$ falls from VH to VL. Similarly to the switching element Q1, the switching elements Q2 and Q3 are also turned on and off according to the voltages $V_{DC2}$ and $V_{DC3}$, respectively.

Figure 3:
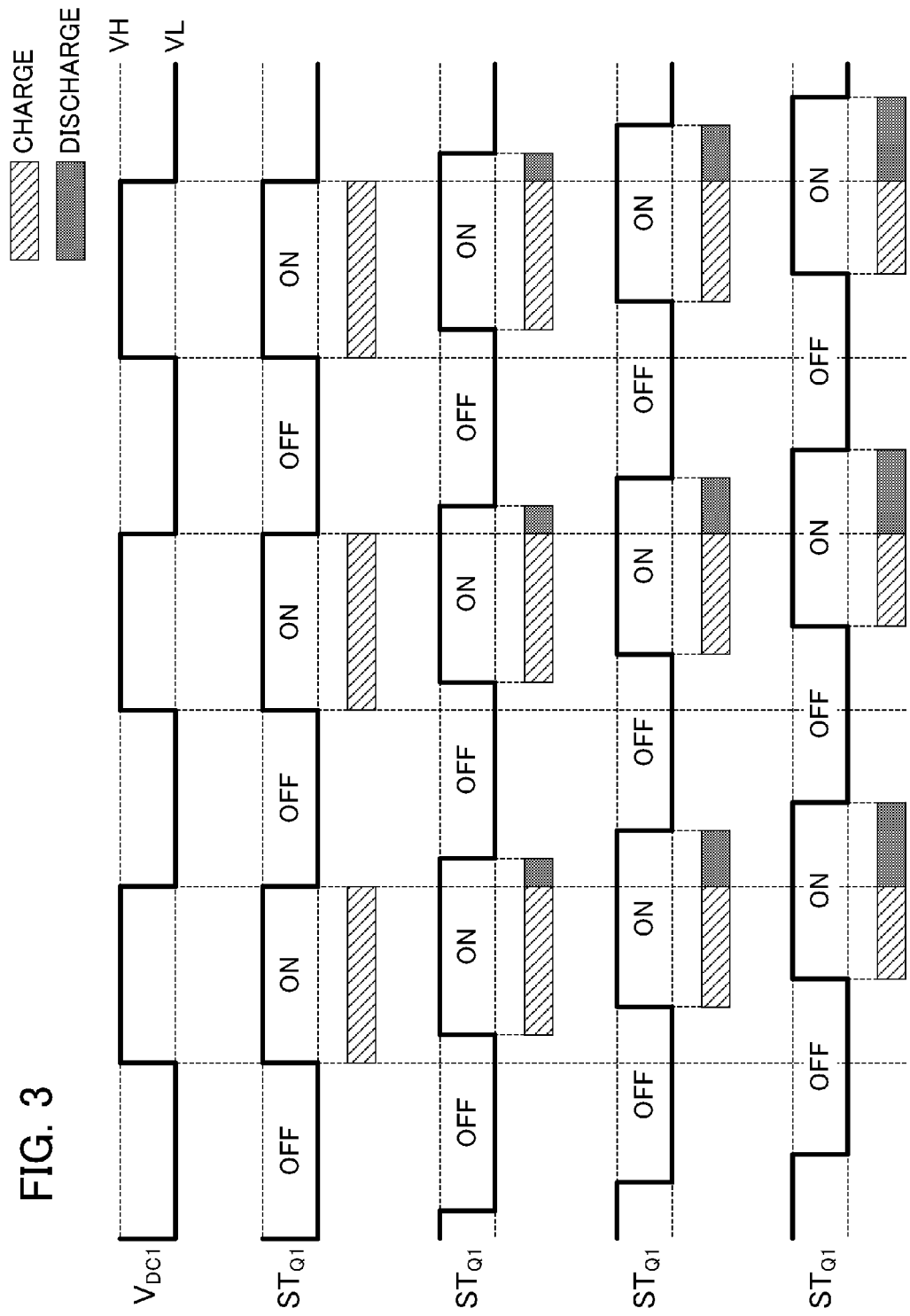
FIG. 3 is a timing chart showing an operation of one of the switching elements.

FIG. 3 is a timing chart showing the operation of the switching element Q1. Referring to FIG. 3, even if a switching frequency of the switching element Q1 is constant, a period in which the battery 6 is charged changes according to a relation between a period in which the switching element Q1 is in the ON state and a period in which the voltage $V_{DC1}$ is VH, and thus a rate of electric power outputted from the phase AC1 of the power generator 5 supplied to the battery 6 also changes. Accordingly, by controlling the switching elements Q1-Q3, it is possible to control electric power supplied to the battery 6, and thus to control charging of the battery 6.

Referring back to FIG. 1, the control circuit 1 is connected to the input terminal IN4, the output terminal OUT, the zero cross signal generating circuit 20, and the drive circuit 30. The control circuit 1 includes a rate-of-change obtaining unit 11, an estimation unit 12, and an output-supply control unit 13, and performs PWM control of the switching elements Q1-Q3.

As will be described later in Step S3 in FIG. 4, the rate-of-change obtaining unit 11 obtains a rate of change of a sensor cycle. As used herein, the sensor cycle refers to a cycle in which a one-shot pulse as the sensor signal is generated, that is, a time period between an immediate previous input of the one-shot pulse to the control circuit 1 and a current input of the one-shot pulse, and is represented by Ta, Tb, Tc, and Td in FIG. 2.

As will be described later in Step S3 in FIG. 4, the estimation unit 12 estimates a next sensor cycle using the rate of change of the sensor cycle obtained by the rate-of-change obtaining unit 11.

As will be described later in Step S4 in FIG. 4, the output-supply control unit 13 determines an operation amount η of the switching elements Q1-Q3 in a next state using the next sensor cycle estimated by the estimation unit 12, and outputs a control signal to the drive circuit 30, and thus the switching elements Q1-Q3 is PWM controlled.

Figure 4:
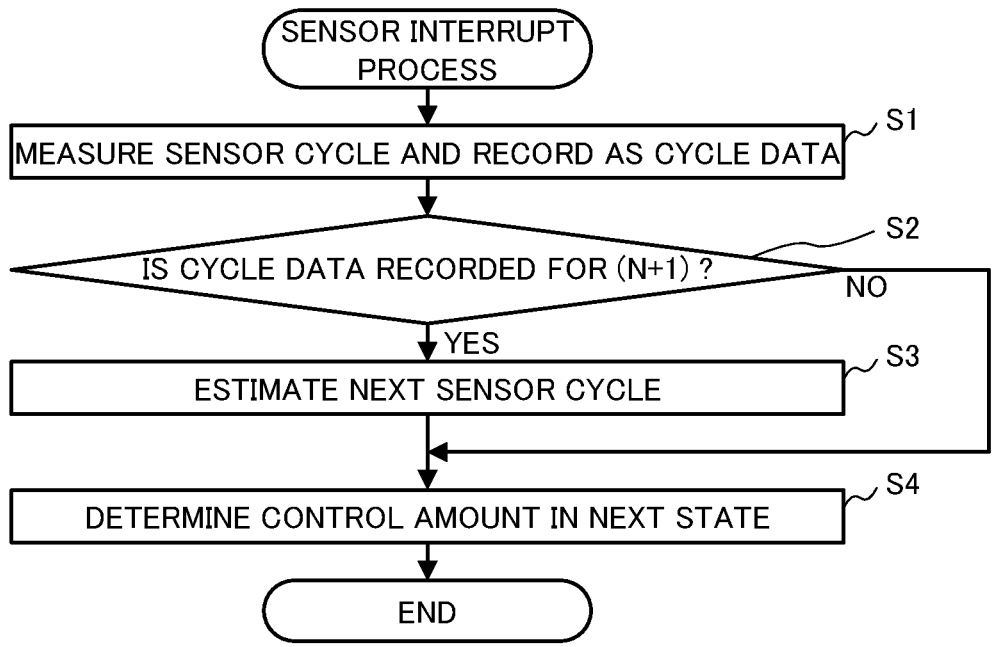
FIG. 4 is a flowchart of sensor interrupt process carried out by a control circuit of the power generation control device provided for the battery charger.

FIG. 4 is a flowchart of a sensor interrupt process carried out by the control circuit 1. The sensor interrupt process is performed with each input of the one-shot pulse generated as the sensor signal by the detection circuit 7 to the control circuit 1.

In Step S1, the rate-of-change obtaining unit 11 measures the sensor cycle, and records the measurement result as cycle data, and the process moves to Step S2. With this, duration of a time period of each of the N states of the power generator 5 is recoded as the cycle data.

In Step S2, the rate-of-change obtaining unit 11 determines whether or not the cycle data is recorded for (N+1) times or more. Then, if it is determined to be recorded, the process moves to Step S3; if it is not determined to be recorded, the process moves to Step S4.

In Step S3, duration of the next state, i. e., a next sensor cycle T(n+1) (where n is any integer) is estimated by the rate-of-change obtaining unit 11 and the estimation unit 12, and the process moves to Step S4. The processing in Step S3 will be described in detail below with reference to FIG. 5.

Figure 5:
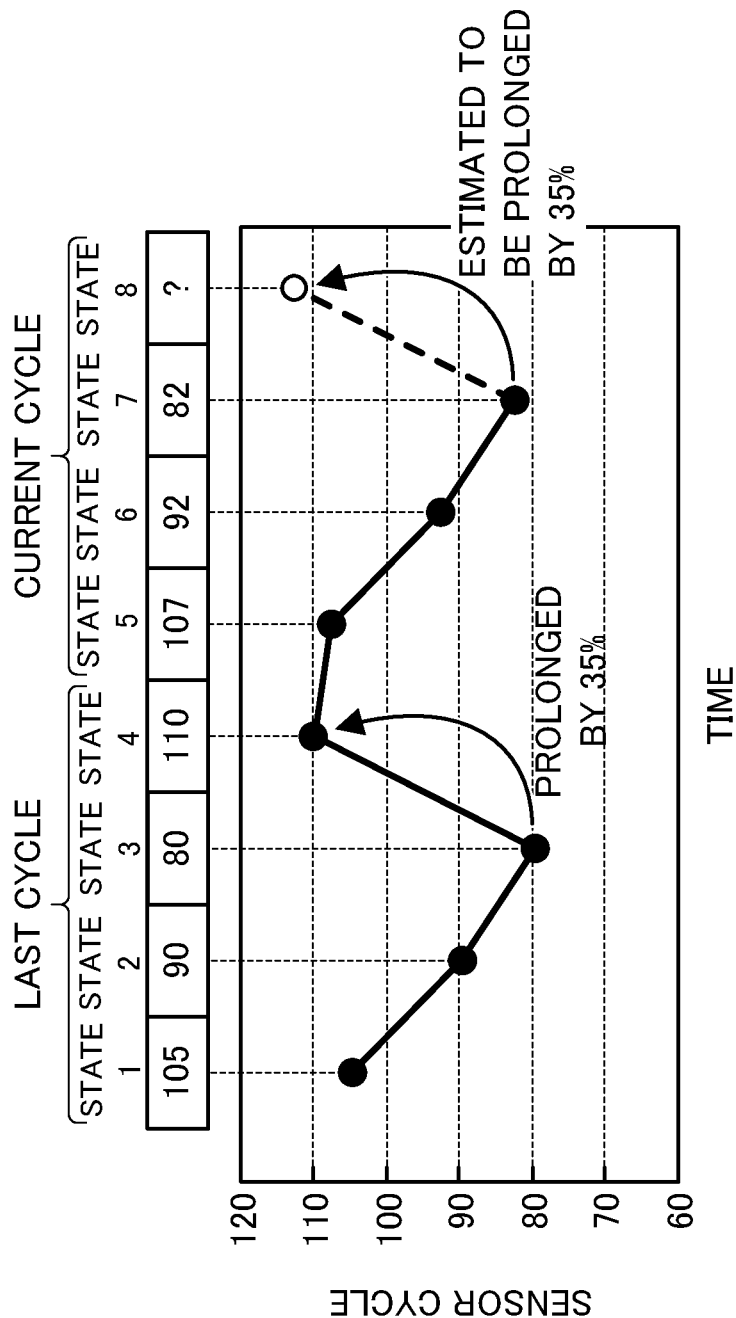
FIG. 5 is a diagram for illustrating an operation of the control circuit.

FIG. 5 illustrates by an example a case in which duration of a state 8, i. e., a sensor cycle for the state 8 is estimated. The state 8 is the next state, and a state 7 is a current state. Referring to FIG. 5, a single cycle of the power generator 5 includes four states, and a state 1 and a state 5 represent the same state. Further, similarly to the state 1 and the state 5, each of states 2-4 and corresponding one of the states 6-8 also represent the same state.

Here, there is a connection between the current operating condition of the power generator 5 and a previous operating condition of the power generator 5. Specifically, if the duration of the state 4 is longer than the duration of the state 3, the duration of the state 8 which is a state coming one cycle after the state 4 becomes longer than the duration of the state 7 which is a state coming one cycle after the state 3. Similarly, if the duration of the state 4 is shorter than the duration of the state 3, the duration of the state 8 which is the state coming one cycle after the state 4 becomes shorter than the duration of the state 7 which is the state coming one cycle after the state 3. Further, a rate of change of the duration of the state 4 with respect to the duration of the state 3 becomes substantially equal to a rate of change of the duration of the state 8 with respect to the duration of the state 7. Accordingly, a rate of change of the sensor cycle for the state 4 with respect to the sensor cycle for the state 3 becomes substantially equal to a rate of change of the sensor cycle for the state 8 with respect to the sensor cycle for the state 7.

Therefore, in the estimation of the sensor cycle for the state 8, the control circuit 1 first causes the rate-of-change obtaining unit 11 to obtain the rate of change of the sensor cycle for the state 4 with respect to the sensor cycle for the state 3. Referring to FIG. 5, the rate of change of the sensor cycle for the state 4 with respect to the sensor cycle for the state 3 is 135%, and the sensor cycle for the state 4 is 35% longer than the sensor cycle for the state 3.

Next, based on the sensor cycle for the state 7, and on the rate of change of the sensor cycle for the state 4 with respect to the sensor cycle for the state 3, the estimation unit 12 estimates a sensor cycle T8 for the state 8 from an expression (1) listed below.

$$T8 = T7 \times RC_{T3\text{-}T4} \quad \text{[Expression (1)]}$$

In the expression (1), T7 represents the sensor cycle for the state 7. Further, $RC_{T3\text{-}T4}$ represents the rate of change of the sensor cycle for the state 4 with respect to the sensor cycle for the state 3. From the expression (1), the sensor cycle T8 for the state 8 is estimated to be "112.75".

Referring back to FIG. 4, in Step S4, the output-supply control unit 13 determines the operation amount η of the switching elements Q1-Q3 in the next state, and outputs the control signal to the drive circuit 30, and the sensor interrupt process shown in FIG. 4 is completed. The processing in Step S4 will be described in detail below.

First, the processing in Step S4 when the rate-of-change obtaining unit 11 has determined that the cycle data is not recorded for (N+1) times or more in Step S2 will be described below. In this case, the control circuit 1 causes the output-supply control unit 13 to determine the operation amount η of the switching elements Q1-Q3 in the next state to be a predetermined value.

Next, the processing in Step S4 when the rate-of-change obtaining unit 11 has determined that the cycle data is recorded for (N+1) times or more in Step S2 will be described below.

In this case, first, based on an output voltage from the power generation control device 100 in a state before the state in which the next sensor cycle T(n+1) is estimated in Step S3, i. e., in the current state, and on a target voltage, the control circuit 1 causes the output-supply control unit 13 to obtain a difference Δdif(n) between the output voltage and the target voltage from an expression (2) listed below.

$$\Delta\text{dif}(n) = V\text{ref} - V\text{out}(n) \quad \text{[Expression (2)]}$$

In the expression (2), Vout(n) represents the output voltage of the power generation control device 100 in the current state. Further, Vref represents the target voltage which is a target value of the output voltage Vout(n) from the power generation control device 100. For example, when the sensor cycle for the state 8 in FIG. 5 is estimated in Step S3, Vout(n) represents the output voltage from the power generation control device 100 in the state 7, and Δdif(n) represents the difference between the output voltage from the power generation control device 100 in the state 7 and the target voltage.

Further, based on an output voltage from the power generation control device 100 in a state immediately before the current state and on the target voltage, the control circuit 1 causes the output-supply control unit 13 to obtain a difference Δdif(n−1) between the output voltage and the target voltage from an expression (3) listed below.

$$\Delta\text{dif}(n-1) = V\text{ref} - V\text{out}(n-1) \quad \text{[Expression (3)]}$$

In the expression (3), Vout(n−1) represents the output voltage of the power generation control device 100 in the state immediately before the current state. Further, Vref represents the target voltage which is a target value of the output voltage Vout(n−1) from the power generation control device 100. For example, when the sensor cycle for the state 8 in FIG. 5 is estimated in Step S3, Vout(n−1) represents the output voltage from the power generation control device 100 in the state 6, and Δdif(n−1) represents the difference between the output voltage from the power generation control device 100 in the state 6 and the target voltage.

Then, based on the difference Δdif(n) between the output voltage from the power generation control device 100 in the current state and the target voltage, and on the difference Δdif(n−1) between the output voltage from the power generation control device 100 in the immediately previous state and the target voltage, the control circuit 1 obtains a control amount θ(n+1) in the next state from an expression (4) listed below.

$$\theta(n+1) = K0 \times \Delta\text{dif}(n) + K1 \times \Delta\text{dif}(n-1) + \theta(n) \quad \text{[Expression (4)]}$$

In the expression (4), K0 and K1 represent a PI constant. Further, θ(n) represents the control amount in the current state, and if the sensor cycle for the state 8 in FIG. 5 is estimated in Step S3, for example, θ(n) is the control amount in the state 7.

Subsequently, based on the next sensor cycle T(n+1) estimated in Step S3, and on the control amount θ(n+1) in the next state, the control circuit 1 determines the operation amount η of the switching elements Q1-Q3 in the next state from an expression (5) listed below.

$$\eta = T(n+1) \times \theta(n+1) \quad \text{[Expression (5)]}$$

Hereinafter, effects provided by the battery charger AA described above will be described with reference to FIG. 6 through FIG. 10.

Figure 6:
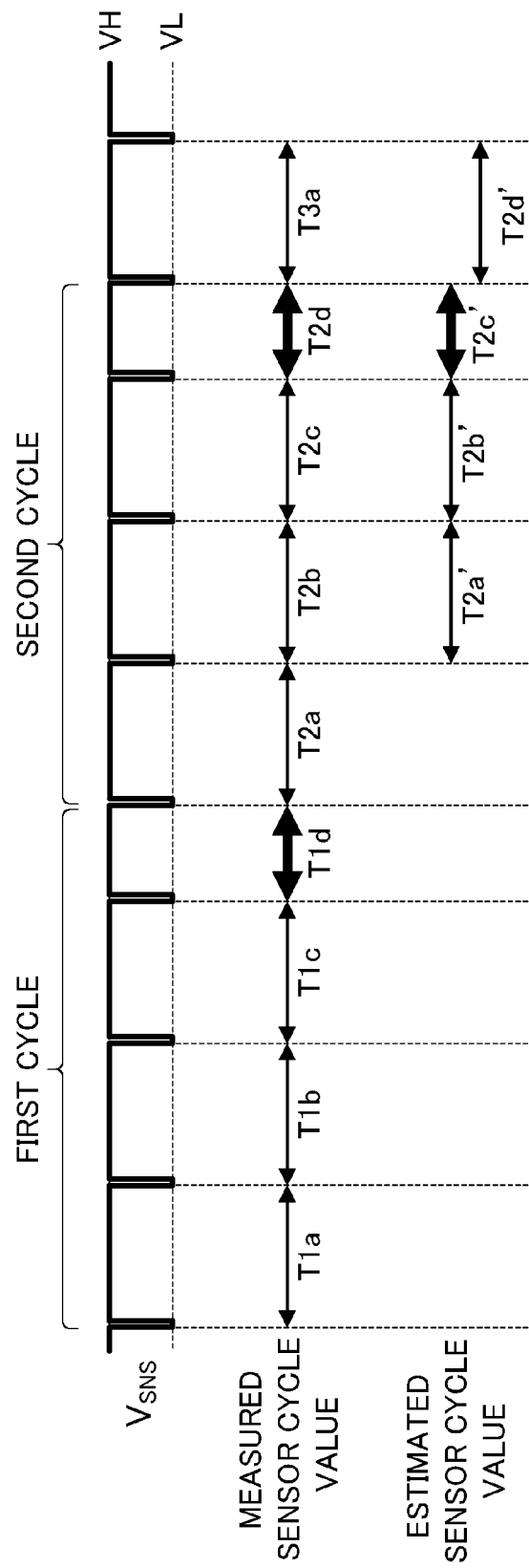
FIG. 6 is a diagram for illustrating an effect of the battery charger.

FIG. 6 is a diagram for illustrating a case in which the control circuit 1 estimates the next sensor cycle in the manner described above. In this case, even if the sensor cycle is not constant, an error may not occur between an actual sensor cycle and an estimated sensor cycle due to the processing in Step S3 in FIG. 4, as with the case of a measured sensor cycle value T2d and an estimated sensor cycle value T2c′.

Figure 7:
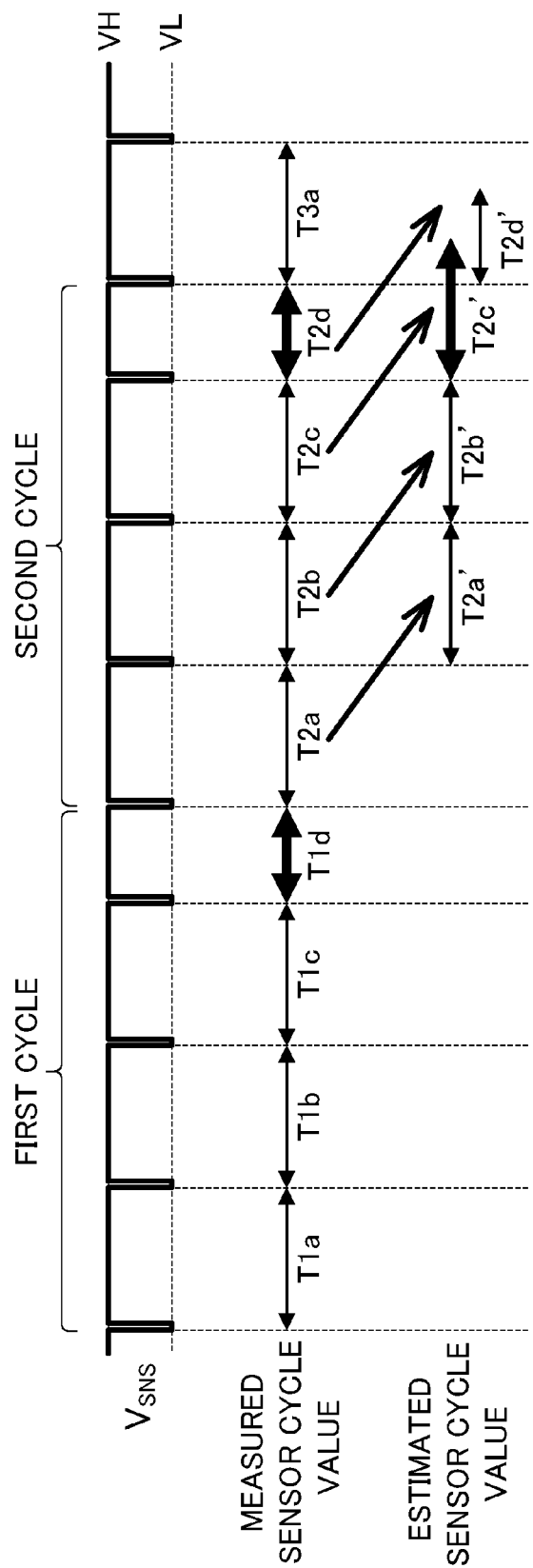
FIG. 7 is a diagram for illustrating an effect of the battery charger.

FIG. 7 is a diagram for illustrating a case in which the next sensor cycle is assumed to be equal to the current sensor cycle, in place of the estimation in the manner described above by the control circuit 1. In this case, if the sensor cycle is not constant, an error may occur between an actual sensor cycle and an estimated sensor cycle, as with the case of the measured sensor cycle value T2*d* and the estimated sensor cycle value T2*c'*.

Figure 8:
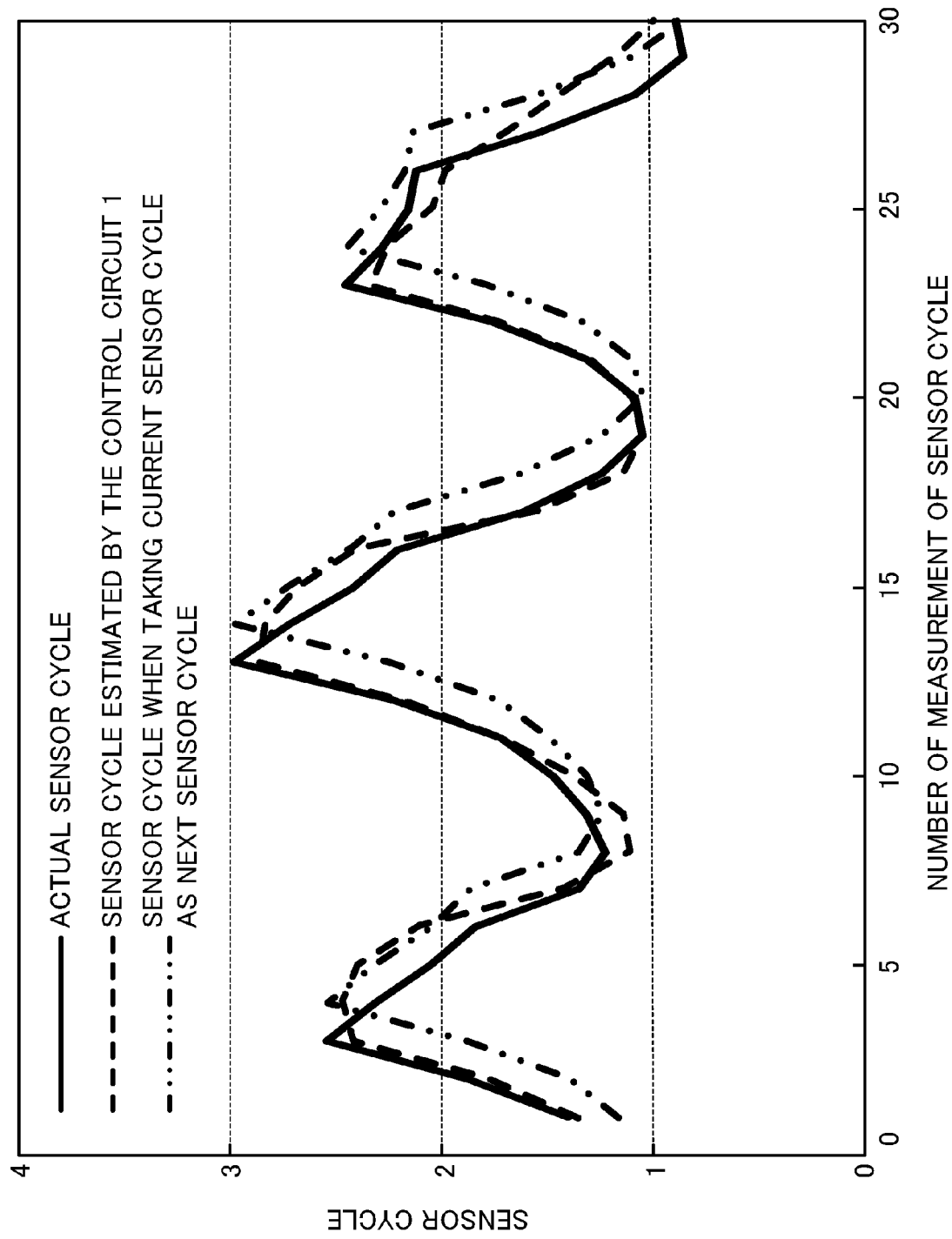
FIG. 8 is a diagram for illustrating an effect of the battery charger.

FIG. 8 is a diagram illustrating the sensor cycle. In FIG. 8, the vertical axis indicates the sensor cycle, and the horizontal axis indicates the number of measurement of the sensor cycle. Further, a solid line indicates the sensor cycle for the sensor signal outputted from the detection circuit 7, that is, the measured value of the sensor cycle. Moreover, a dashed line indicates the sensor cycle estimated by the control circuit 1 in the manner described above with reference to FIG. 6. In addition, an alternate long and two short dashes line indicates the sensor cycle when the next sensor cycle is assumed to be equal to the current sensor cycle, as described above with reference to FIG. 7.

As shown by FIG. 8, the control circuit 1 is able to estimate the sensor cycle that is closer to the measured value as compared to the case in which the next sensor cycle is assumed to be equal to the current sensor cycle.

Figure 9:
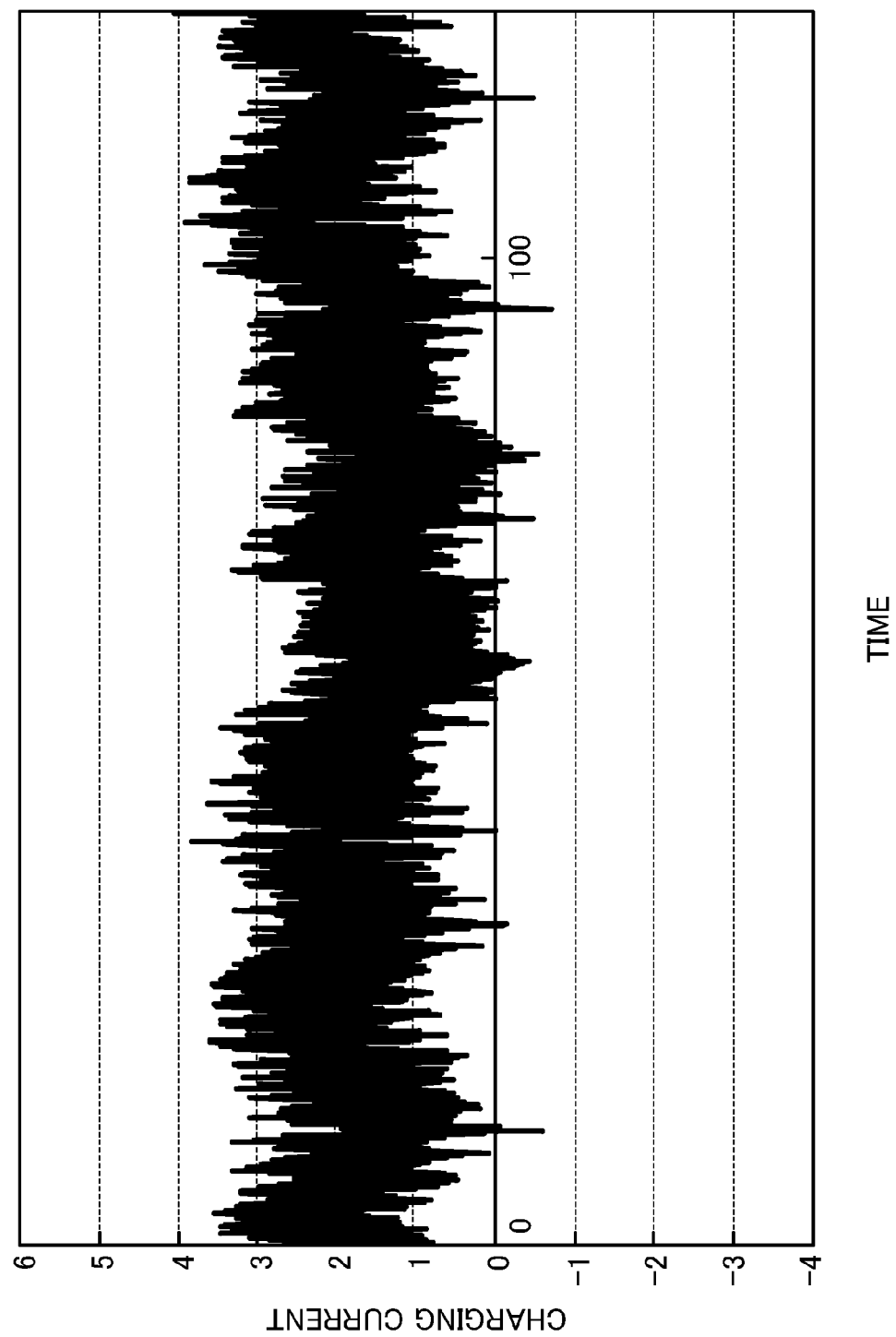
FIG. 9 is a diagram for illustrating an effect of the battery charger.
Figure 10:
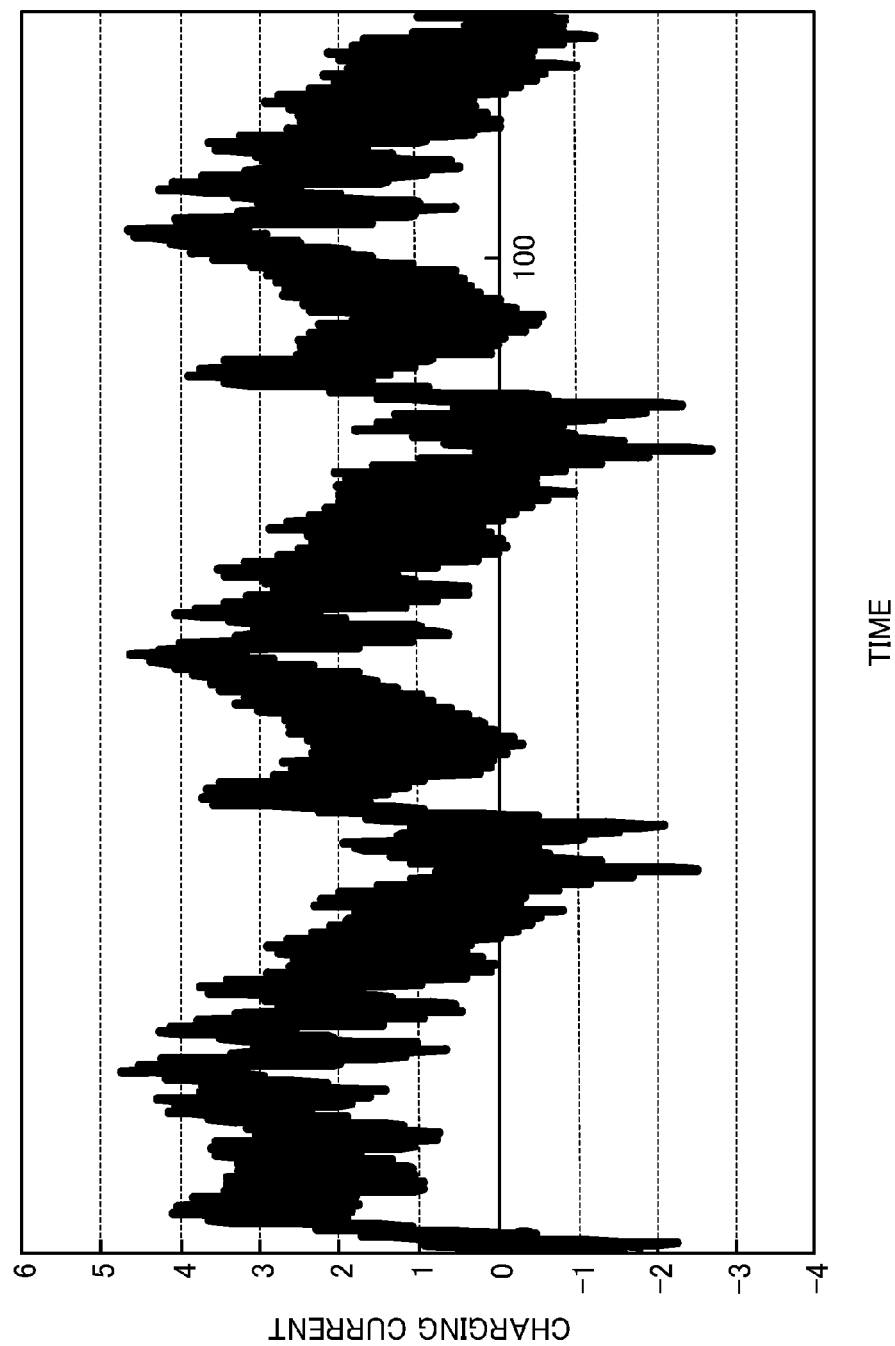
FIG. 10 is a diagram for illustrating an effect of the battery charger.
Figure 11:
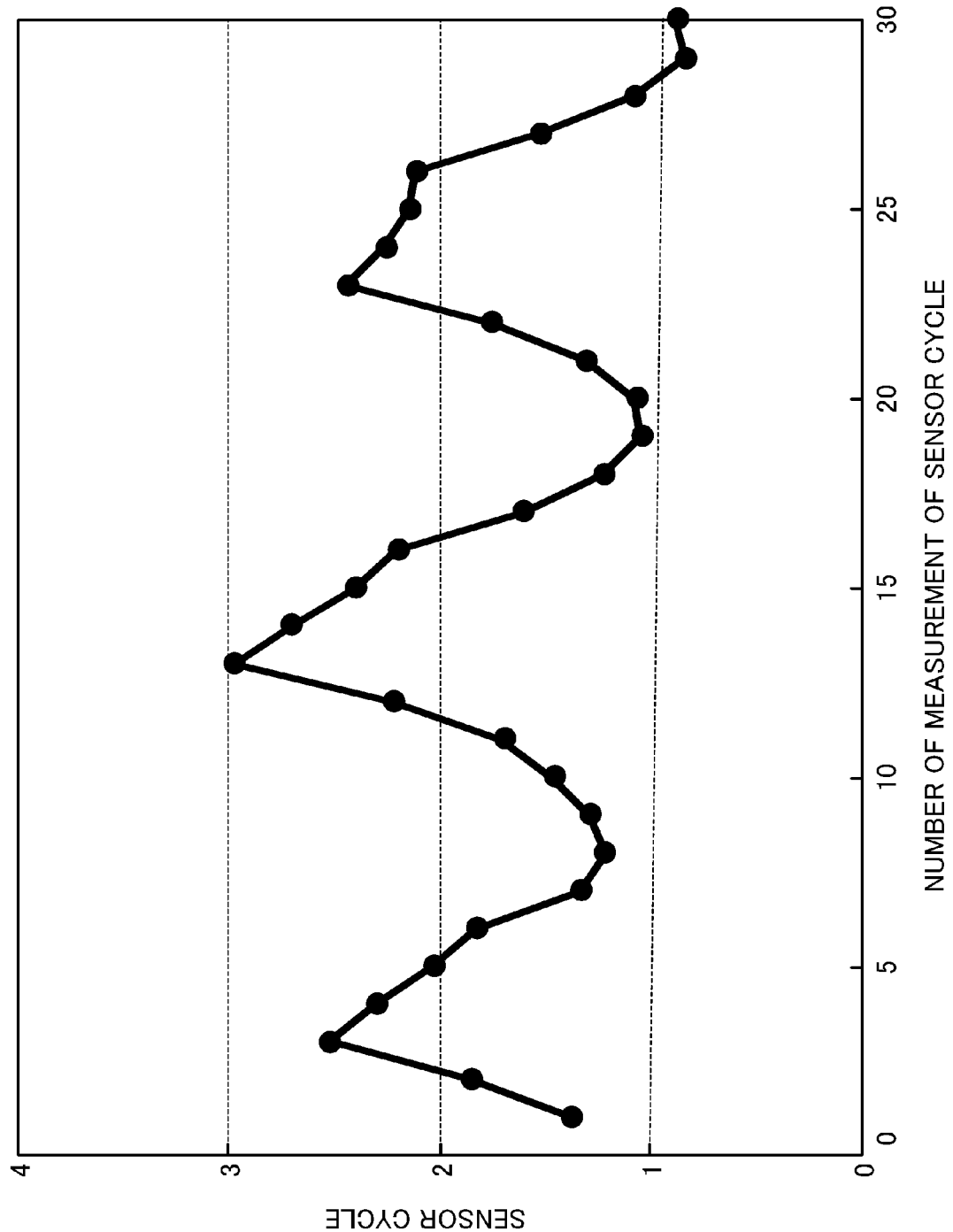
FIG. 11 is a chart showing time periods of strokes in a four-stroke engine.
Figure 12:
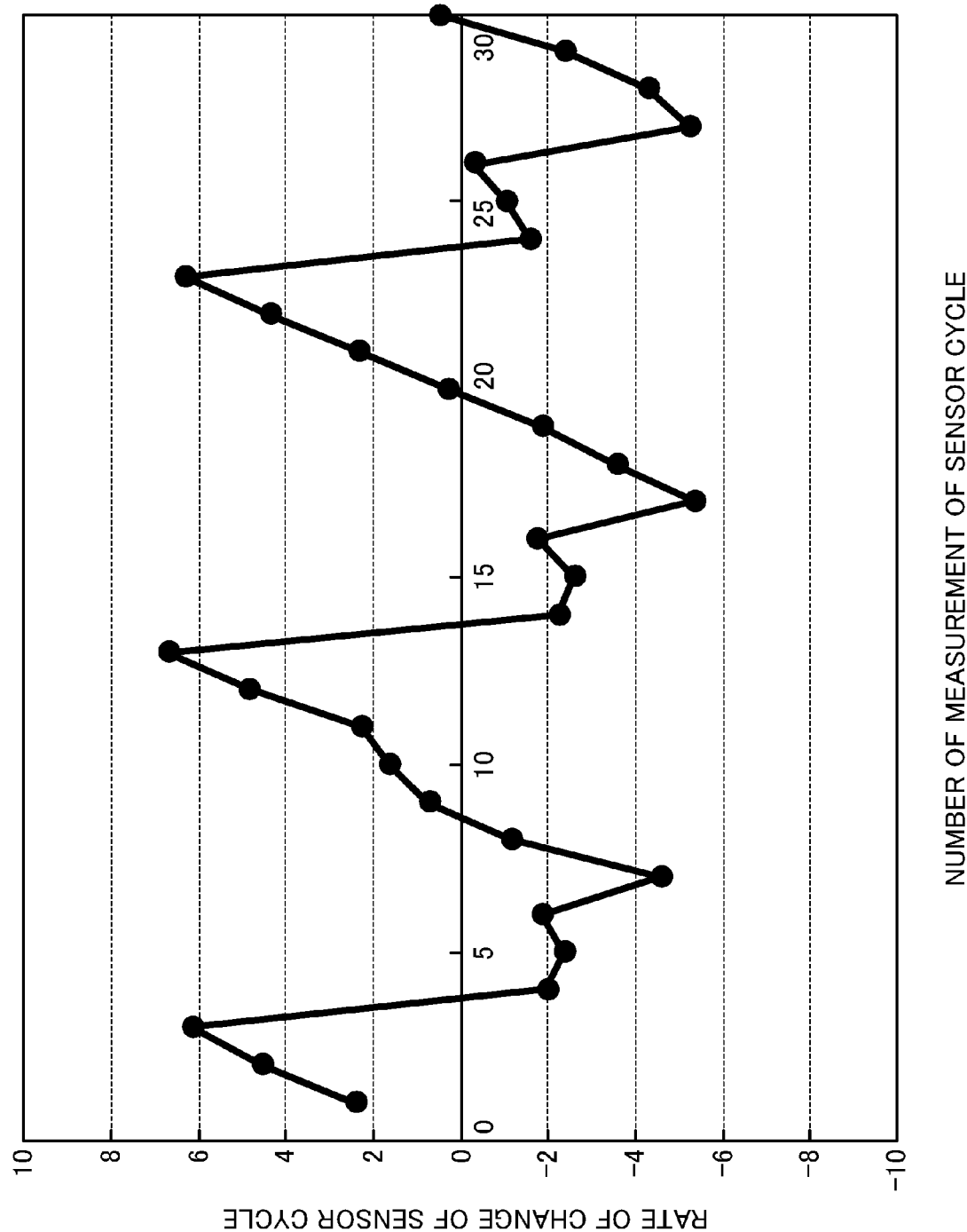
FIG. 12 is a chart showing rates of change of the time periods of the strokes in the four-stroke engine.

FIG. 9 is a diagram showing a charging current supplied to the battery 6 in a case in which the drive circuit 30 is controlled according to the result of the estimation of the sensor cycle by the control circuit 1 as described above with reference to FIG. 6. On the other hand, FIG. 10 is a diagram showing a charging current supplied to the battery 6 in a case in which the drive circuit 30 is controlled assuming that the next sensor cycle is equal to the current sensor cycle as described with reference to FIG. 7. In either of FIG. 9 and FIG. 10, the vertical axis indicates the charging current supplied to the battery 6, and the horizontal axis indicates time.

As shown by FIG. 9 and FIG. 10, the control circuit 1 is able to supply the charging current more stably to the battery 6 as compared to the case in which the next sensor cycle is assumed to be equal to the current sensor cycle. Accordingly, with the power generation control device 100, it is possible to efficiently supply electric power from the power generator 5 to the battery 6.

The present invention is not limited to the above embodiment, and various modifications and applications may be made without departing from the spirit of the invention.

For example, in the above embodiment, the battery 6 is employed as a load to which electric power is supplied from the power generator 5, but the present invention not limited to this example.

Further, in the above embodiment, the power generator 5 has, but not limited to, the three phases, and may have a single phase or four phases, for example.

Moreover, in the above embodiment, the control circuit 1 performs, but not limited to, PWM control of the switching elements Q1-Q3 provided for the drive circuit 30, and may perform phase control, for example.

Furthermore, in the above embodiment, the detection circuit 7 generates the one-shot pulse every time it detects that the state of the power generator 5 has switched, but the present invention not limited to this example. For example, the detection circuit 7 may generate the one-shot pulse every time a zero cross for each of the phases AC1-AC3 of the power generator 5 is detected. In addition, if the power generator 5 is driven by an engine, the one-shot pulse may be generated every time an angle of rotation of the engine becomes a predetermined angle, for example.

Further, in the above embodiment, when the next sensor cycle is estimated in Step S3 in FIG. 4, the sensor cycle in one cycle before is used in the manner as described with reference to FIG. 5, but the present invention not limited to this example. For example, a sensor cycle in two cycles before, or a sensor cycle in three cycles before may be used, or the sensor cycle in one cycle before and the sensor cycle in two cycles before may be used in combination.

REFERENCE MARKS IN THE DRAWINGS

1: Control Circuit
5: Power Generator
6: Battery
7: Detection Circuit
8: Fuse
10: Control Circuit
11: Rate-Of-Change Obtaining Unit
12: Estimation Unit
13: Output-Supply Control Unit
20: Zero Cross Signal Generating Circuit
30: Drive Circuit
100: Power Generation Control Device
Q1-Q3: Switching Elements
AA: Battery Charger

The invention claimed is:

1. A control circuit for controlling electric power supplied from an alternating-current generator driven by an internal-combustion engine to a load, wherein,
   a single cycle of the internal-combustion engine includes a plurality of strokes, and a state of the alternating-current generator shifts as the stroke of the internal-combustion engine shifts, and
   the circuit comprises:
      a rate-of-change obtaining unit configured to obtain a rate of change of duration of a first state with respect to duration of a second state, when the state of the alternating-current generator shifts from the second state to the first state;
      a estimation unit configured to estimate the duration of the first state when the state of the alternating-current generator shifts from the second state to the first state, based on the duration of the second state, and on the rate of change obtained by the rate-of-change obtaining unit in a previous cycle of the internal-combustion engine; and
      an output-supply control unit configured to control supply of an output from the alternating-current generator to the load using a result of the estimation by the estimation unit.

2. The control circuit according to claim 1, wherein
   the output-supply control unit controls the supply of the output from the alternating-current generator to the load using the duration estimated by the estimation unit, a voltage supplied to the load in a third state that comes before the second state and a target voltage in the third state, and a voltage supplied to the load in the second state and a target voltage in the second state.

3. A power generation device, comprising:
   the control circuit according to claim 1, wherein
   electric power outputted from the alternating-current generator is supplied to the load.

\* \* \* \* \*